United States Patent [19]
Flusberg

[11] Patent Number: 4,620,305
[45] Date of Patent: Oct. 28, 1986

[54] GAS LASER AND METHOD OF OPERATION

[75] Inventor: Allen M. Flusberg, Newtown, Mass.

[73] Assignee: Avco Everett Research Laboratory, Inc., Everett, Mass.

[21] Appl. No.: 651,108

[22] Filed: Sep. 17, 1984

[51] Int. Cl.$^4$ .............................................. H01S 3/00
[52] U.S. Cl. ..................................................... 372/37
[58] Field of Search .............................. 372/37, 55, 57

[56] References Cited

U.S. PATENT DOCUMENTS

| | | | |
|---|---|---|---|
| 3,611,191 | 10/1971 | Altman et al. | 372/37 |
| 3,747,015 | 7/1973 | Buczek | 372/37 |
| 3,761,836 | 9/1973 | Pinsley et al. | 372/37 |
| 4,151,486 | 4/1979 | Itzkan et al. | 331/94.5 P |
| 4,211,983 | 7/1980 | Daugherty et al. | 331/94.5 PE |
| 4,397,025 | 8/1983 | Kebabian | 372/37 |
| 4,475,199 | 10/1984 | Sanders et al. | 372/37 |

OTHER PUBLICATIONS

Linford; "Experimental Studies of . . . Apparatus"; *Applied Optics;* vol. 12, No. 6; Jun. 1973, pp. 1130–1138.
Le Floch et al., "Polarization Effects in Zeeman Lasers"; *Physical Review A;* vol. 4, No. 1; Jul. 1971; 290–5.
Magic–Angle Photoionizations Elimination of the Zeeman Inhomogeneity 12/81.
Theory of Photoionization in a Static Magnetic Field 12/81.

*Primary Examiner*—William L. Sikes
*Assistant Examiner*—Robert E. Wise
*Attorney, Agent, or Firm*—Melvin E. Frederick

[57] ABSTRACT

Gaseous lasers and their operation wherein during operation in the saturated regime Zeeman reorientation collisions do not occur rapidly compared to the rate at which population is transferred out of their upper lasing level and there exists a static magnetic field of predetermined minimum strength inside the lasing region that is preferably at, or substantially at, the magic angle (approximately 54.70) with respect to the predominate polarization of the laser light in the lasing cavity.

15 Claims, 2 Drawing Figures

GAS LASER AND METHOD OF OPERATION

This invention relates to gaseous lasers and their method of operation and more particularly to gaseous lasers subject to Zeeman inhomogeneities.

The present invention is based on my consideration initially of the then totally unsupported possibility that Zeeman inhomogeneities might exist in gaseous lasers and that if they did their reduction or elimination in certain gaseous lasers but not all gaseous lasers might, again possibly, favorably affect the efficiency of such lasers. For a discussion of the optimization of photoionization of atoms by lasers by elimination of Zeeman inhomogeneities in a low pressure atomic vapor which eliminates the photoexcitation transition-rate inhomogeneity which, in turn, normally causes atoms initially in different Zeeman states to be excited by photoionization at different rates, see my papers entitled, "Magic Angle Photoionization: Elimination of the Zeeman Inhomogeneity", Physical Review A, Volume 24, No. 6, Page 3080, December 1980, and "Theory of Photoionization In A Static Magnetic Field", Physical Review A, Volume 24, No. 6, Page 3061, December 1980.

While the optimization of photoionization of atoms by lasers by elimination of the Zeeman inhomogeneity does not, and did not to me, teach or even reasonably suggest that Zeeman inhomogeneities exist in gaseous lasers or that if they did exist their elimination would improve the efficiency of certain but not all lasers, the mechanisms for elimination in both cases is the same. It was only after I began considering the possibilities that Zeeman inhomogeneities might exist in certain gaseous lasers and that if they were eliminated, this in turn might improve the efficiency of these lasers, that I realized that the process used to optimize photoionization might also be used to improve the efficiency of certain lasers.

My consideration of the previously noted possibilities was based on assumptions I made, as will now be set forth merely by way of explanation, that some lasers inherently possess natural sources of inhomogeneity associated with, for example, optical selection rules, the polarization of light and Zeeman-state degeneracy, but that when such lasers are operated in the small-signal or unsaturated regime, their inhomogeneities do not lead to any noticeable effects since in this regime the average interaction of light of any polarization with the lasing atoms or molecules are uneffected by the inhomogeneity. However, I further assumed that the above noted inhomogeneity arises, at least in part, because the rate at which a given Zeeman state of the upper level of the laser is depleted, is in general, a function of the particular Zeeman state, and hence that if a gaseous laser is operated in the large-signal or saturated regime this inhomogeneity will adversely affect the operation of the laser. I concluded that this is because in the saturated regime different Zeeman states are depleted at different rates which are not negligible. Based on the preceding assumptions, it will now be seen that laser light which is polarized in a laser so as to interact most strongly with the least depleted Zeeman state or states will tend to experience the greatest optical gain and light polarized so as to interact most strongly with most depleted Zeeman state or states will experience the least optical gain. Thus, since such a laser will tend to contain just the polarization which interacts most strongly with the most depleted Zeeman state or states, it follows that if there are, in fact, substantially depleted Zeeman states, a loss of efficiency will invariably occur as the population builds up in the Zeeman states which interact most weakly with the laser light.

It was then concluded that the above noted efficiency loss due to the inhomogeneity in the interaction of Zeeman states with light is negligible in many lasers because of the presence therein of reorientation collisions which tend to reorient the angular momentum of the lasing atoms or molecules and which is effective to transfer population from one Zeeman state to another. If such collisions exist and occur more rapidly than the rate at which population is transferred out of the upper lasing level (whether by spontaneous emission, stimulated emission, or collisions) then the efficiency loss due to Zeeman inhomogeneity will be negligible. Accordingly, the present invention is applicable only to those gaseous lasers in which reorientation collisions do not occur rapidly compared to the rate at which population is transferred out of the upper lasing level. Possible examples of such lasers are: helium-neon lasers, excimer lasers (such as KrF, XeF, XeCl, and ArF) and other gaseous lasers such as, for example, low pressure alkali metallic vapor lasers using potassium or cesium atomic metallic vapors in which reorientation collisions are not very rapid. Typically, such lasers are gaseous low pressure lasers and/or low pressure laser pumped gaseous lasers.

In view of the above discussion, it will now be seen that the present invention is applicable only to lasers such as, for example, helium-neon lasers, excimer lasers, metallic vapor lasers and other gaseous lasers wherein reorientation collisions do not occur rapidly compared to the rate at which population is transferred out of their upper lasing level.

The present invention comprises the provision and use in lasers of the above last mentioned type, of a magnetic field within the lasing region having at least a component of predetermined minimum strength lying in a plane transverse to the optical axis and that is preferable at, or substantially at, the "magic" angle (approximately 54.7°) with respect to the predominate polarization of laser light within the lasing region. While the optimum angle is the magic angle, the angle should be a large angle but substantially less than ninety degrees. In lasers which, for other reasons already have an applied magnetic field of adequate strength and an optimum or preferred orientation in the lasing region, that is otherwise suitable, the polarization of laser light need only be caused to lie at preferably the aforementioned magic angle with respect to the magnetic field. The magnetic field must be of sufficient strength to induce in the gaseous lasing medium an electron precession rate much more rapid than the rate at which population is transferred out of the Zeeman states of the upper lasing level.

For a further and detailed discussion of a gaseous laser having a magnetic field in the lasing region for the purpose of reducing, if not eliminating, selfpinching and scattering, reference is made to U.S. Pat. No. 4,211,983, assigned to the same assignee as this invention, which is incorporated herein as if set out at length. For a further discussion and incorporation herein of low pressure atomic metallic vapor lasers see also U.S. Pat. No. 4,151,486.

Incorporation of the present invention in lasers of the type specified herein, and/or operation of such lasers in accordance with the present invention results in the optimization of the interaction of laser light within such lasers with the lasing medium therein and a consequent increase in efficiency as a result of the elimination of the loss of efficiency that would otherwise normally exist.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a diagrammatic illustration of an excimer laser in accordance with the invention; and FIG. 2 is a geometric configuration illustrating the basic relationships between laser light polarization and a magnetic field within the lasing cavity of lasers in accordance with the invention.

DETAILED DESCRIPTION

Figure 1:
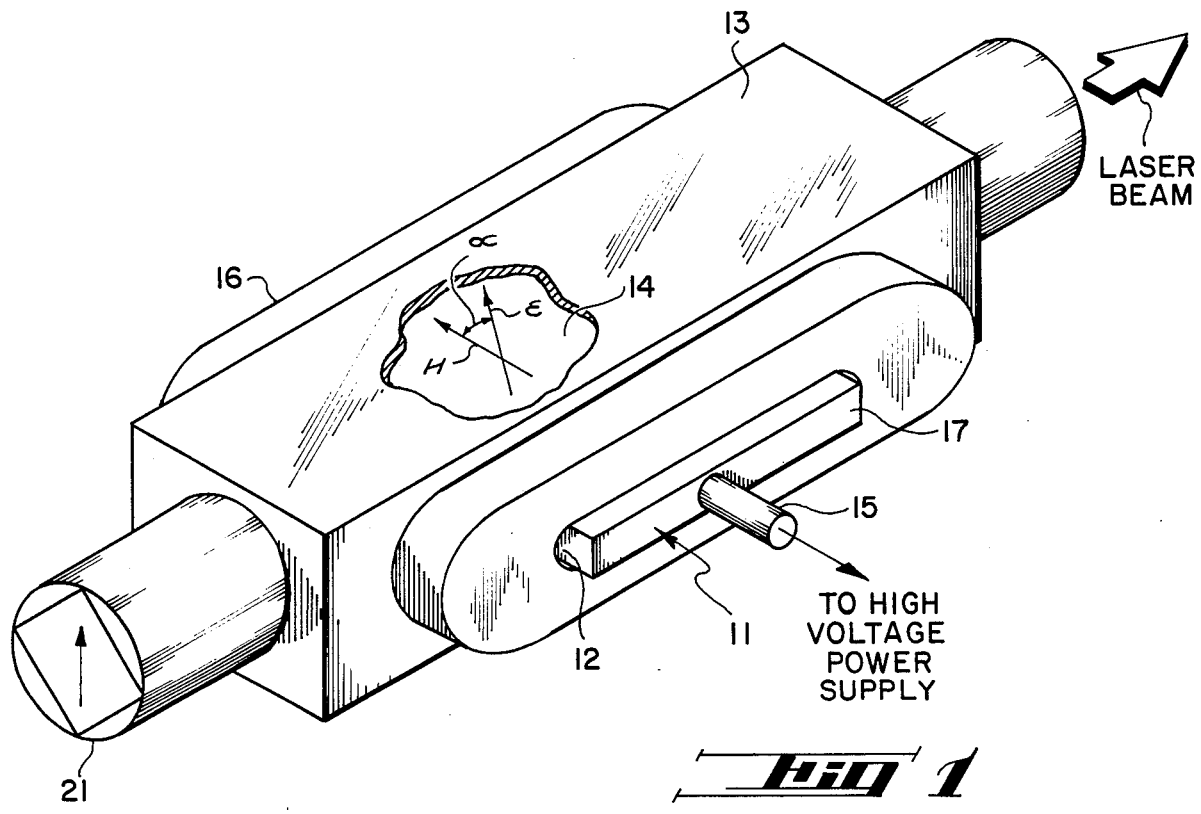

Referring now to FIG. 1, there is shown a conventional electron beam generator designated generally by the numeral 11 comprising a vacuum chamber 12 and lead in structure 15 carried by a housing 13 defining a conventional laser cavity 14. The vacuum chamber 12 is evacuated by a conventional pumping system (not shown) and the laser cavity 14 is maintained at a desirable pressure of working gas by a conventional gas handling system (not shown). The vacuum chamber 12 and lasing cavity 14 are separated by a conventional thin gas-tight electron transparent foil (not shown). Within the vacuum chamber 12, there may be located a conventional cold cathode system and an accelerating screen or grid anode and a cathode (not shown). A lead-in structure 15 permits connection of the internal components of the vacuum chamber to suitable power supplies. The lead-in structure 15 may be coupled to a high voltage power supply such as, for example, a Marx capacitive generator or cable type generator of pulsating high voltage to cause emission of an electron beam. The electron beam as introduced into the laser cavity may have a broad cross sectional area, corresponding to a broad longitudinal sectional area of the laser cavity sufficient in relation to the pressure of the working medium therein, overall volume of the laser cavity, applied voltages and current flow to establish a pumping discharge in the cavity.

Magnetic field coils 16 and 17 carried by the housing 13 are provided at the laser cavity 14 and arranged to typically provide a magnetic field therein as schematically indicated at H. The polarity of the magnetic field is not critical and may be in either direction. For the specific embodiment having the relationship shown and described herein, merely by way of example, at least a component vector of the magnetic field is parallel or anti-parallel to the electron beam current (when present) and coincident therewith.

The lasing action within the laser cavity 14 when a suitable gaseous lasing medium therein is pumped by the electron beam (or a discharge created therefrom and/or an external laser beam in the case of an amplifier) creates an optical beam which, in the case of an oscillator, as illustrated in FIG. 1, travels back and forth between two reflectors 21 and 22, one of which is shown at 21, in a direction perpendicular to the direction of the magnetic field. The electron beam current and/or discharge current, if any, is established, in conventional manner, in a direction transverse to the direction of optical beam movement in the laser cavity 14. The gas or other working medium in the laser cavity is lasable and the electron beam, where used, is sufficient alone or in combination with a discharge established by electrodes in the laser cavity 14, to provide a population inversion sufficient to support stimulated emission of radiation in the medium.

The reflectors and/or Brewster windows, or the like, are orientated with respect to the magnetic field vector H to provide within the laser cavity polarized light having a polarization $\epsilon$ at preferably the magic angle $\alpha$ as shown in FIG. 1.

While an oscillator is shown and described herein for purposes of simplicity and convenience, it is to be understood that the invention is equally applicable to amplifiers. In the case of an amplifier the reflectors may be omitted and it is only necessary to have input and output windows. The polarization in this case may be determined by the oscillator which creates the beam incident on the amplifier.

The magnetic coils 16 and 17 can be made of copper strip conductors which are covered with insulation and shaped to provide the necessary magnetic field. The coils are typically designed to generate a magnetic field, at least roughly aligned with the electron beam. The Coils may be uncooled or cooled by liquid or gas coolants. In some instances, it will be desirable to cool to near absolute zero (e.g., 4.2° K., helium boiling temperature) to operate the conductors of coils 16 and 17 superconductively (the conductors being formed of appropriate metals for the purpose—e.g., Nb, Nb Sn, V Ga, Nb-Ti alloys or combinations thereof).

Figure 2:
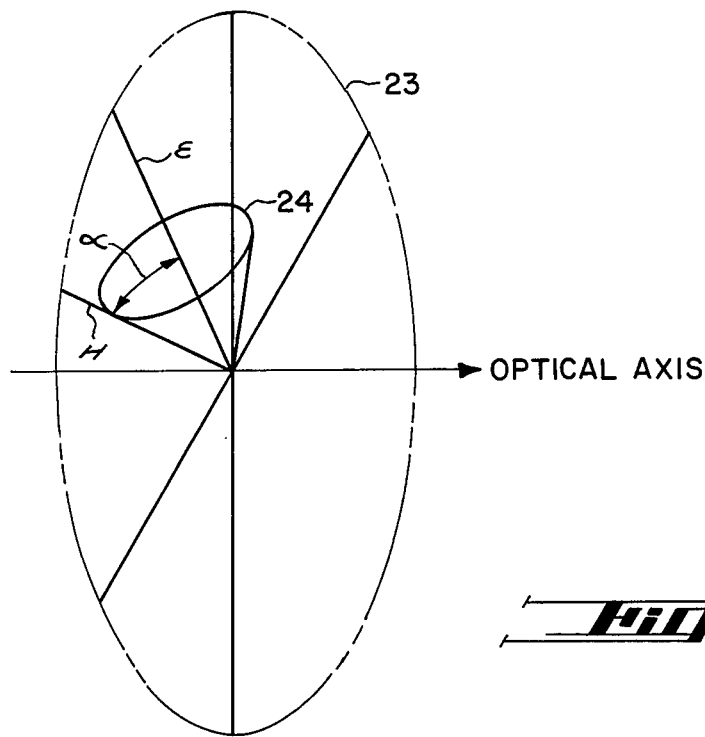

Directing attention now to FIG. 2, there is shown the basic geometric relationship of the electric field of the laser light or direction of linear laser polarization $\epsilon$ and the magnetic field H. The polarization $\epsilon$ is constrained (as by injection or intracavity optics such as, for example, Brewster windows) to lie at preferably the magic angle $\alpha$ with respect to H or visa-versa. Thus, the polarization $\epsilon$ may lie anywhere on the plane 23 normal to the optical axis as shown in FIG. 2. In this case, the magnetic field vector H may lie anywhere along the surface of Cone 24, so long as it has a component transverse to the optical axis having the aforementioned specified strength. Alternatively, within the limits available, the polarization $\epsilon$ may lie anywhere along the surface of a cone, the half-angle of which is preferably the magic angle $\alpha$ and the axis of which lies along the magnetic field H.

A magnetic field in accordance with the invention must be sufficiently large that the angular momentum of the lasing molecules, which is to say the electron precession, precesses about magnetic field lines much more rapidly than the rate at which population is transferred out of the Zeeman states of the upper lasing level. It should be noted that the precession rate of the atomic or molecular angular momentum is approximately given by the Zeeman splitting, measured in frequency units. A typical Zeeman splitting is 2 MHz per gauss of applied magnetic field. Thus the magnetic field (measured in gauss) is required to be large compared to the transition rate out of the upper lasing level divided by $4\pi 10^6$.

If a gaseous lasing medium is isotropic, and collisional electron spin flipping is negligible, then polarized light produces an anisotropy and therefore may not be expected to interact equally with all the molecules. Injecting polarized light, in this case, can cause a loss of extraction efficiency rather than an increase.

However, the anisotropy of such a medium in accordance with the present invention may be removed by the application of a suitable magnetic field. A magnetic field causes electron spins to precess at a rate of approximately 2 MHz/gauss. A sufficiently strong magnetic field thus will rapidly mix spin states if the states correspond to quantization along a direction different from that of the magnetic field. As has been previously noted hereinabove, to ensure a high extraction efficiency, one therefore applies a strong enough DC magnetic field at an angle with respect to the polarization of the laser light. The magnetic field must be strong enough to mix the spin states faster than the relevant transition rates. For an excimer laser, for example, with $I/I_{SAT} \sim 5$, and an upper-level lifetime Y of $\sim 5$ nsec, the relevant transition rate is $\sim I/I_{SAT}Y \sim 10^9 s^{-1}$. Since the spins precess at $\sim 2$ MHz/G, a field greater than $\sim 1$ kG will be adequate. The magnetic field should be applied at a large angle with respect to the polarization (but not 90°). The magic angle $\alpha = \cos^1 1/\sqrt{3} \simeq 55°$ is an optimum angle, but angles close to this value will work almost as well.

Since certain excimer amplifier lasers already have a magnetic field of $\sim 10$ kG applied perpendicular to the optical axis, in these cases the injected laser light or beam need only be polarized at an angle of about 55° with respect to such a magnetic field to ensure maximum extraction efficiency.

A magnetic field in accordance with the invention causes the angular momentum vector of the atoms or molecules of the gaseous lasing medium to precess about the magnetic field lines of force. Since the selection rules depend on the component of the polarization of the light along the angular momentum vector of the atom, the magnetic field causes a rapid oscillation in the relative strength of the transition rate, at least in the "classical" sense. The result is that the Zeeman inhomogeneity decreases when a suitable magnetic field is applied. A magnetic field in accordance with the invention at the magic angle with respect to the polarization of light substantially reduces, if not completely eliminates, the inhomogeneity for the following reason: With respect to quantization of angular momentum along the magnetic field, the polarization of the light appears to have equal components along all three possible directions—along the field, positively circular, and negatively circular. When the magnetic field is large (according to the criteria described above) the transitions induced by the three components of the light polarization are incoherent with one another. Thus from the point of view of the atoms or molecules of the lasing medium, the situation is the same as if the light were completely unpolarized and incident isotropically. All the Zeeman states then undergo transitions at the same rate, and the Zeeman inhomogeneity vanishes. The laser then operates most efficiently, since there are no Zeeman states with excess population and a weaker interaction rate with the light.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In the method of operating a laser device having a lasing cavity having an optical axis and a gseous lasing medium having an upper lasing level disposed in said lasing cavity, the steps comprising:
    (a) pumping said lasing medium therein to produce population inversion and stimulated emission in the saturated regime wherein the rate of stimulated emission is at least not substantially less than the sum of all other rates at which population is transferred out of said upper lasing level;
    (b) causing the rate of collisions of lasing atoms and molecules occuring in said lasing medium during pumping to occur less rapidly than the sum of all the rates at which population is transferred out of said upper lasing level;
    (c) generating within said cavity a DC magnetic field having an axis having a first predetermined orientation at least a component of which is transverse to the optical axis and of amplitude sufficient to induce an electron precession rate large compared to the said transition rate out of said upper lasing level; and
    (d) polarizing laser light generated in said cavity to cause said light to have a predominate polarization orientated with respect to the axis of said magnetic field at angle of at least about 55° and less than 90°.

2. The method as defined in claim 1 wherein the laser device is an excimer laser.

3. The method as defined in claim 1 wherein the strength of said magnetic field is greater than 1,000 gauss.

4. The method as defined in claim 1 wherein the laser device is an excimer amplifier laser, the axis of the magnetic field is normal to the optical axis and the strength of the magnetic field is about 10,000 gauss.

5. The method as defined in claim 1 wherein said second orientation of said laser light is provided by Brewster windows.

6. The method as defined in claim 1 wherein the said second orientation of said laser light is provided by intracavity optics.

7. The method as defined in claim 1 wherein the laser device is an amplifier laser and an externally generated laser beam is introduced into said lasing cavity.

8. The method as defined in claim 7 wherein said external laser beam is generated to have said second predetermined orientation.

9. The method as defined in claim 1 wherein said second predetermined orientation lies in a plane normal to the optical axis.

10. In gas laser apparatus having a lasing cavity having an optical axis, a gaseous lasing medium having an upper lasing level disposed in said lasing cavity, and means for pumping said lasing medium therein to produce population inversion and stimulated emission in the saturated regime wherein the rate of stimulated emission is at least not substantially less than the sum of all other rates at which population is depleted from said upper laser level, the rate of collisions of lasing atoms and molecules during pumping occurring less rapidly than the transition rate at which said population is depleted from said upper lasing level, the combination comprising:
    (a) first means for generating within said cavity a DC magnetic field having an axis having a first predetermined orientation at least a component of which is transverse to the optical axis and having a field strength sufficient to induce an electron precession rate large compared to the said transition rate out of the upper lasing level of said gaseous medium; and (b) second means for providing laser light generated in said cavity to have predominate polarization having a second predetermined orientation, said first and second means providing said first and second orientations at an angle of at least about 55° one with another but less than 90°.

11. The combination as defined in claim 10 wherein the strength of said magnetic field transverse to the optical axis is not less than 1,000 gauss.

12. The combination as defined in claim 10 wherein said first predetermined axis of said magnetic field is normal to the optical axis and the strength of said magnetic field is about 10,000 gauss.

13. The combination as defined in claim 10 wherein said second means comprises intracavity optic means.

14. The combination as defined in claim 10 wherein said lasing cavity is terminated by window means transparent to said stimulated emission and concentric about said optic axis, and additionally including third means for generating externally of said lasing cavity, a polarized laser beam having said second predetermined orientation and passing said laser beam through said lasing cavity along said optical axis.

15. The combination as defined in claim 10 wherein said first predetermined orientation at least substantially lies in a plane normal to the optical axis, and the second predetermined orientation lies in a plane normal to the optic axis.

* * * * *